E. E. GOLD.
THERMOSTATIC VALVE.
APPLICATION FILED JAN. 6, 1919.
1,339,057. Patented May 4, 1920.
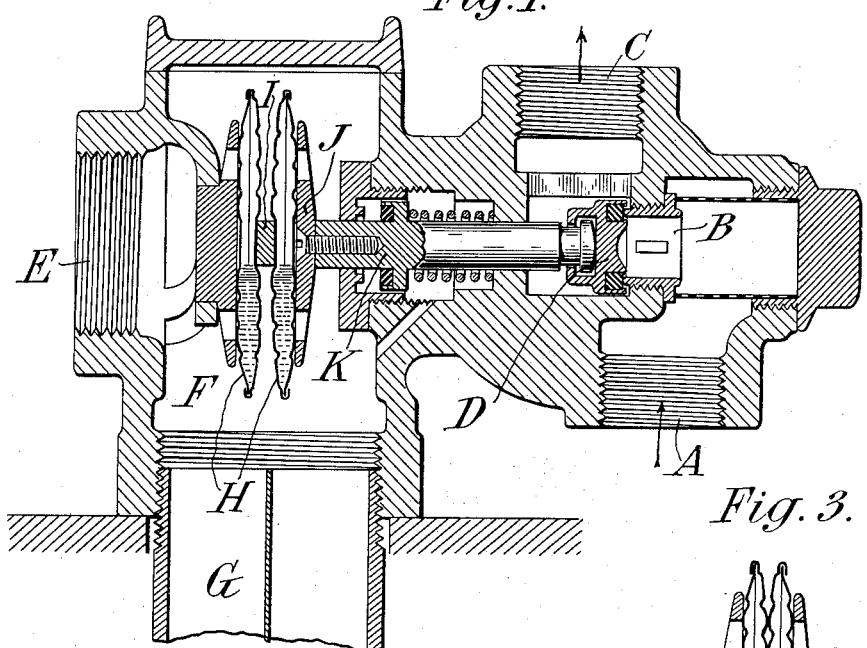
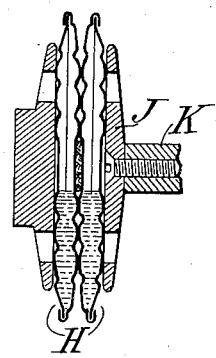
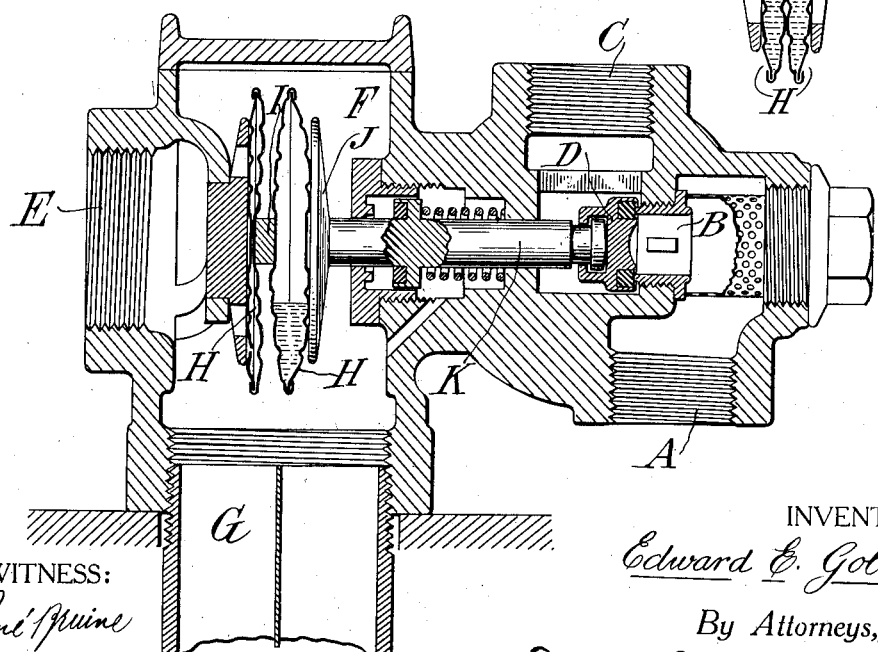
INVENTOR
Edward E. Gold,
By Attorneys,
Fraser, Dark & Myers

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

THERMOSTATIC VALVE.

1,339,057.   Specification of Letters Patent.   Patented May 4, 1920.

Application filed January 6, 1919. Serial No. 269,756.

*To all whom it may concern:*

Be it known that I, EDWARD E. GOLD, a citizen of the United States of America, residing in the borough of Manhattan, city, county, and State of New York, have invented certain new and useful Improvements in Thermostatic Valves, of which the following is a specification.

The object of my invention is to improve the construction of thermostatic steam valves, and it has to do more particularly with the form of thermostat used to control the movements of the valve.

In its specific aspect, the invention is intended to afford a thermostat that can be utilized with steam or other high temperature fluid without danger of disorganizing the operation of the valve, should a break occur in the thermostatic unit.

The invention is especially applicable to thermostatically controlled car heating systems, and consists generally in providing, as the thermostat to control the heating medium, one comprising two or more vessels which are distinct from each other and independently expansible. Under ordinary conditions, if both vessels are operative, the combined action of the two acts to close the valve when the temperature goes above a predetermined point, and to open the valve if it drops below such point, while if one of the vessels becomes fractured, or develops a leak which would prevent its expansion, it can collapse against the remaining vessel, which latter is expansible beyond its normal point, sufficiently to effect the necessary opening and closing movements of the valve until the defective vessel can be removed and replaced.

My improvement has been designed to take care of systems in which a thermostat is subjected to extreme changes and consequent excessive wear, and to overcome what has hitherto been a serious defect in car heating apparatus, because of the not infrequent breakage of a thermostatic vessel, which has resulted in an entire disorganization of the vessel and heating unit dependent upon such thermostat.

The invention can be adapted to any movable member subject to thermostat control, such as a damper, for instance, and is applicable in various types of apparatus, including steam traps and similar installations, where it becomes necessary to govern the passage of a fluid through temperature changes, although I have found it admirably suited to car heating systems such as previously mentioned.

To these and other ends, the invention consists in certain improvements and combinations of parts, as will be hereinafter more fully described, the novel features being pointed out in the claims at the end of the specification.

In the drawings—

Figure 1 is a sectional view illustrating, in a preferred embodiment, one practical mode of carrying out the invention, the thermostatic vessels appearing in the normal expanded relation;

Fig. 2 is a similar sectional view illustrating one of the thermostatic vessels collapsed, and the remaining one expanded beyond its normal position to close the valve; and Fig. 3 is a detail, sectional view, showing a slightly modified arrangement of diaphragms, or vessels.

For the sake of illustration, I have disclosed what I consider to be a preferred application of the invention, although it is useful in other relations as well, and for the purpose of this embodiment there is illustrated here a portion of a steam or vapor car heating system.

A designates a passage adapted to be connected with a steam supply pipe, and to feed steam through the port B and thence to the inlet C, which is connected with a suitable heating unit or radiator, and from which the heating fluid passes to such radiator when the controlling valve D is open and uncovers the port B. E designates a return pipe connected with the heating unit or radiator referred to above, and acting to conduct the heating fluid or exhaust steam from the radiator to the exhaust chamber F and thence to the outlet G. Arranged within the exhaust chamber F, and directly in the path of the outgoing steam or vapor, is the thermostat which controls the valve D.

The thermostat consists of a plurality of vessels, two of these being shown in the form illustrated, and each consisting of a hollow container H, formed of diaphragms connected together in the usual manner. Each vessel H is complete in itself, there being no communication between them and they are thus independently expansible. The vessels are arranged in contacting relationship, and preferably have attached therebetween a spacing block I, or are united by a soldered joint, as in Fig. 3. The thermostat is connected to the valve D by means of a thrust-piece or plate J and stem K. The vessels are interposed between J and a stationary abutment which receives the reaction of their expansive thrust. The vessels H are provided interiorly with a volatile fluid preferably of a character which volatilizes only at high temperatures, and is particularly fitted for use in conjunction with thermostatically controlled apparatus where the thermostat is governed by steam or similar medium of a rather high degree of heat.

In a car heating apparatus, the mechanism such as described above may be interposed above or below the floor of a car and is subject to sudden and extreme changes, by reason of which the thermostatic vessels are frequently broken or become leaky and inoperative. If this happens with the present arrangement, the device will continue to operate in the emergency until such time as it can be conveniently repaired, and a new vessel substituted, without interfering with the proper heating of the car. Fig. 2 illustrates how this is accomplished, one of the vessels appearing entirely collapsed and the other one expanded beyond its normal extent. The parts can be readily so designed that the possible expansion of one vessel is sufficient to effect the necessary opening and closing movements of the valve, at such times as the remaining vessel may be broken and entirely collapsed. When both vessels are operating normally, the movement of the outer one is transmitted to the inner one through the block I, which is joined to the adjacent walls of the two vessels, although this arrangement is not essential, as the adjacent walls of the vessels may be secured to each other directly, as by soldering or otherwise, or may be unattached.

While the invention possesses great utility in the particular relation shown, and when operating under the influence of steam or similar high temperature fluid, it is not necessarily confined to this application, and it is to be understood that the construction may be employed with lower temperatures, and variously modified without departing from the underlying purpose of the improvement.

What I claim is:—

1. A thermo-motive device for operating a control element in response to the temperature of a fluid, consisting of a reaction abutment, a thrust-piece for actuating such control element, and a plurality of distinct thermostatic diagram vessels each containing a volatile liquid, interposed between said abutment and thrust-piece, adapted by their normal collective expansion to move the latter for operating said element, and each adapted to expand sufficiently to perform such movement in case the other becomes inoperative, and adapted when contracted to be withdrawn from between said parts for replacement.

2. A structure according to claim 1, characterized in that the thermostat vessels are arranged within a chamber through which the hot fluid is caused to pass, said chamber being only slightly larger than the vessels and acting to cause the fluid to concentrate its action upon the vessels.

3. A thermostatic steam valve for car heating systems, comprising in combination a steam supply for a heating unit, a valve controlling said supply, an exhaust chamber through which steam passes after leaving the heating unit, a reaction abutment in said chamber, a thrust-piece connected to actuate said valve, and a pair of distinct thermostatic diaphragm vessels each containing a volatile liquid, interposed between said abutment and thrust-piece, adapted by their normal collective expansion to move the latter for operating said valve, and each adapted to expand sufficiently to perform such movement in case the other becomes inoperative, and adapted when contracted to be withdrawn from between said parts for replacement.

In witness whereof I have hereunto signed my name.

EDWARD E. GOLD.

Witness:
    HARRY C. POILLON.